(12) United States Patent
Choi et al.

(10) Patent No.: US 11,234,173 B2
(45) Date of Patent: Jan. 25, 2022

(54) SERVING INTERNET OF THINGS (IOT) DEVICES IN A WIRELESS NETWORK

(71) Applicant: Cisco Technology, Inc., San Jose, CA (US)

(72) Inventors: Young Il Choi, San Jose, CA (US); Vishal Satyendra Desai, San Jose, CA (US); Santosh Babaji Kulkarni, San Jose, CA (US); Pooya Monajemi, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 246 days.

(21) Appl. No.: 16/407,897

(22) Filed: May 9, 2019

(65) Prior Publication Data

US 2020/0359285 A1 Nov. 12, 2020

(51) Int. Cl.
*H04W 36/06* (2009.01)
*H04W 52/02* (2009.01)

(52) U.S. Cl.
CPC ....... *H04W 36/06* (2013.01); *H04W 52/0216* (2013.01)

(58) Field of Classification Search
CPC .. H04W 36/06; H04W 52/0216; H04W 84/12
See application file for complete search history.

(56) References Cited

U.S. PATENT DOCUMENTS

| 9,775,045 | B2 | 9/2017 | Li et al. |
| 10,033,577 | B2 | 7/2018 | Soriaga et al. |
| 10,805,936 | B1* | 10/2020 | Uln ..................... H04B 1/1027 |
| 2013/0083753 | A1 | 4/2013 | Lee et al. |
| 2015/0305040 | A1* | 10/2015 | Xia ..................... H04W 16/14 370/337 |
| 2017/0311290 | A1 | 10/2017 | Adjakple et al. |
| 2019/0075469 | A1* | 3/2019 | Mahoney .............. H04W 16/12 |
| 2019/0364492 | A1* | 11/2019 | Azizi ................ H04W 52/0264 |
| 2019/0364505 | A1* | 11/2019 | Wang ................ H04W 52/0235 |
| 2020/0404589 | A1* | 12/2020 | Wang ................ H04W 52/0235 |

OTHER PUBLICATIONS

Chang, et al., "Design and Implementation of an IoT Access Point for Smart Home", Applied Sciences, Article, ISSN 2076-3417, pp. 1882-1903, 2015, MDPI.
Deng, et al., "On Quality-of-Service Provisioning in IEEE 802.11ax WLANs", Special Section on Green Communications and Networking for 5G Wireless, vol. 4, IEEE Access, pp. 6086-6104, 2016, IEEE.

(Continued)

*Primary Examiner* — Saad A. Waqas
(74) *Attorney, Agent, or Firm* — Behmke Innovation Group LLC; Kenneth J. Heywood; Jonathon P. Western (57) ABSTRACT

In one embodiment, a device assigns a first radio of an access point in a wireless network to a client serving role and a second radio of the access point to a channel monitoring role. The device associates a wireless client with the first radio. The device determines that the wireless client is a low bandwidth client. The device switches the wireless client from the first radio to the second radio of the access point assigned to the channel monitoring role.

17 Claims, 8 Drawing Sheets

(56) References Cited

OTHER PUBLICATIONS

Lear, et al., "Manufacturer Usage Description Specification", Network Working Group, draft-ietf-opsawg-mud-22, May 25, 2018, 33 pages, IETF Trust.
Magrane, Byron, "School's in: Flexible Radio Assignment", online: https://blogs.cisco.com/wireless/schools-in-flexible-radio-assignment, Feb. 12, 2016, printed Apr. 29, 2019, 9 pages, Cisco Systems, Inc.
Nurchis, et al., "Target Wake Time: Scheduled access in IEEE 802.11ax WLANs", arXiv:1804.07717v1, pp. 1-13, Apr. 20, 2018., arXiv.org.
Reiter, et al., "Wireless connectivity for the Internet of Things", White Paper, 13 pages, Jun. 2014, Texas Instruments Incorporated.
"802.11AX", White Paper, https://www.arubanetworks.com/assets/wp/WP_802.11AX.pdf, 38 pages, Accessed on Sep. 25, 2018., Aruba Networks.
"Cisco Enterprise Wireless Intuitive Wi-Fi Starts Here", https://www.cisco.com/c/dam/en/us/products/collateral/wireless/nb-06-wireless-wifi-starts-here-ebook-cte-en.pdf, 151 pages, Accessed on Oct. 1, 2018., Cisco.
"Flexible Radio Assignment (FRA) and Redundant Radios", Radio Resource Management White Paper, Jun. 24, 2016, 18 pages, Cisco Systems, Inc.
"Understanding Flexible Radio Assignment (software overview)", Cisco Aironet Series 2800/3800 Access Point Deployment Guide, May 11, 2016, 2 pages, Cisco Systems, Inc.

\* cited by examiner

SERVING INTERNET OF THINGS (IOT) DEVICES IN A WIRELESS NETWORK

TECHNICAL FIELD

The present disclosure relates generally to computer networks, and, more particularly, to serving Internet of Things (IoT) devices in a wireless network.

BACKGROUND

The Internet of Things, or "IoT" for short, represents an evolution of computer networks that seeks to connect many everyday objects to the Internet. Notably, there has been a recent proliferation of "smart" devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room, when a person enters the room.

In contrast to many traditional computer networks, various challenges are presented with IoT devices, such as lossy links, low bandwidth, battery operation, low memory and/or processing capability of the device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to the IoT.

As noted, most IoT devices are of very low capability. For example, an IoT sensor may wake periodically, transmit a relatively small amount of data, such as a sensor reading, and then return to sleep. This behavior is typically very different from those of other devices on a wireless network and can needlessly consume network resources.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device assigns a first radio of an access point in a wireless network to a client serving role and a second radio of the access point to a channel monitoring role. The device associates a wireless client with the first radio. The device determines that the wireless client is a low bandwidth client. The device switches the wireless client from the first radio to the second radio of the access point assigned to the channel monitoring role.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services.

Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
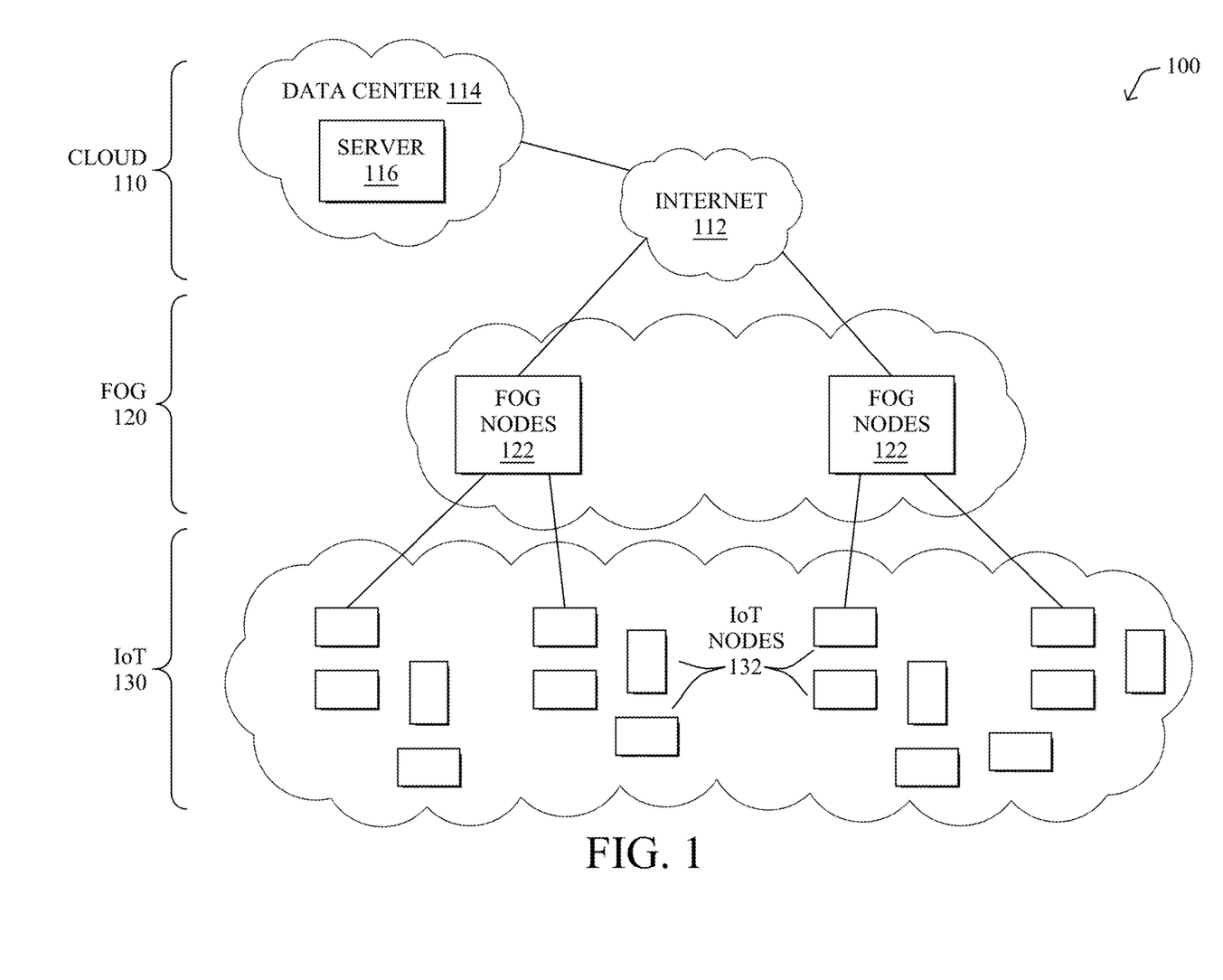
FIG. 1 illustrate an example computer network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
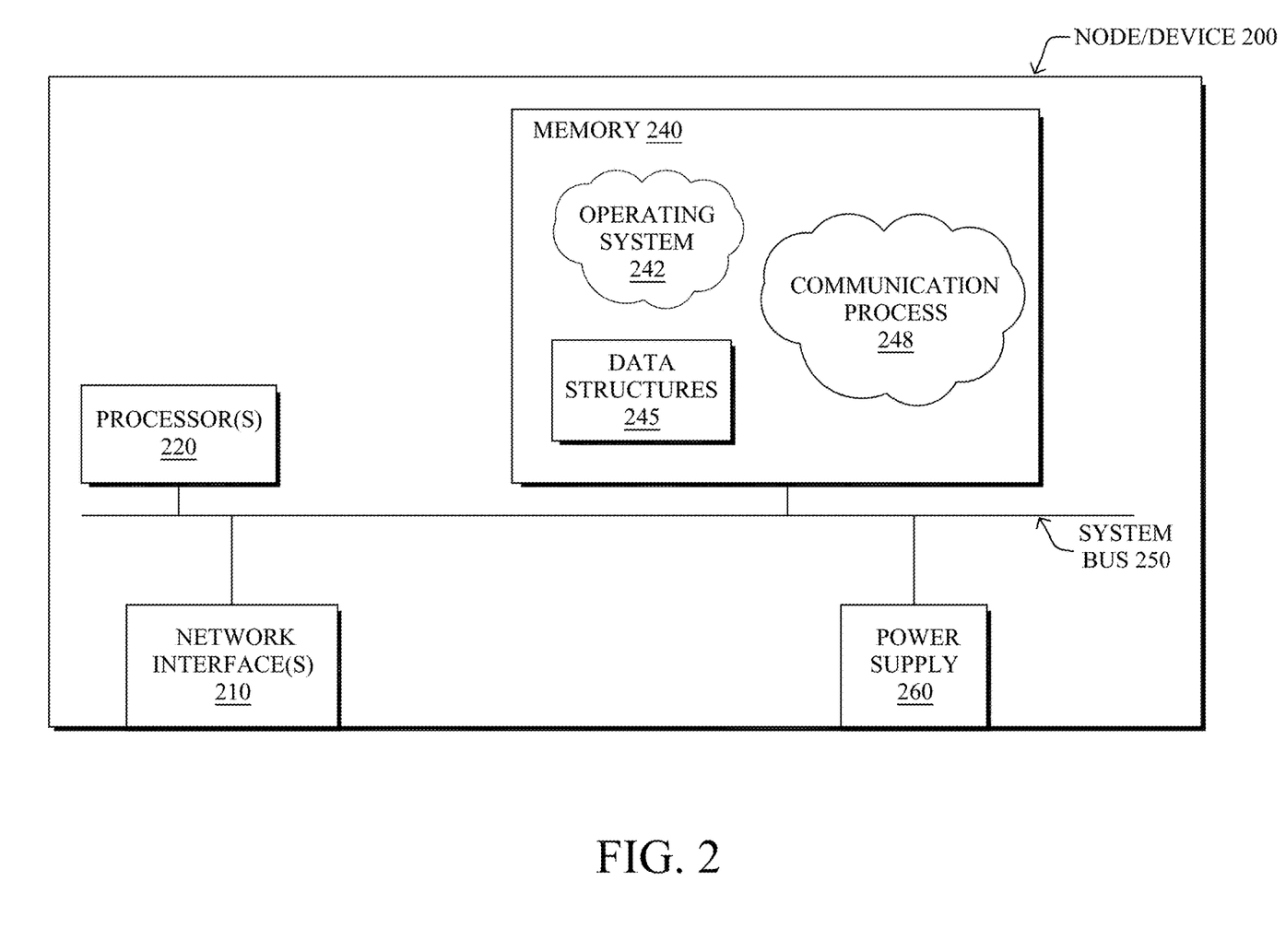
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data to and/or from a network. For example, network interface(s) 210 may include a wireless receiver, transmitter, or both (e.g., a transceiver).

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise a communication process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
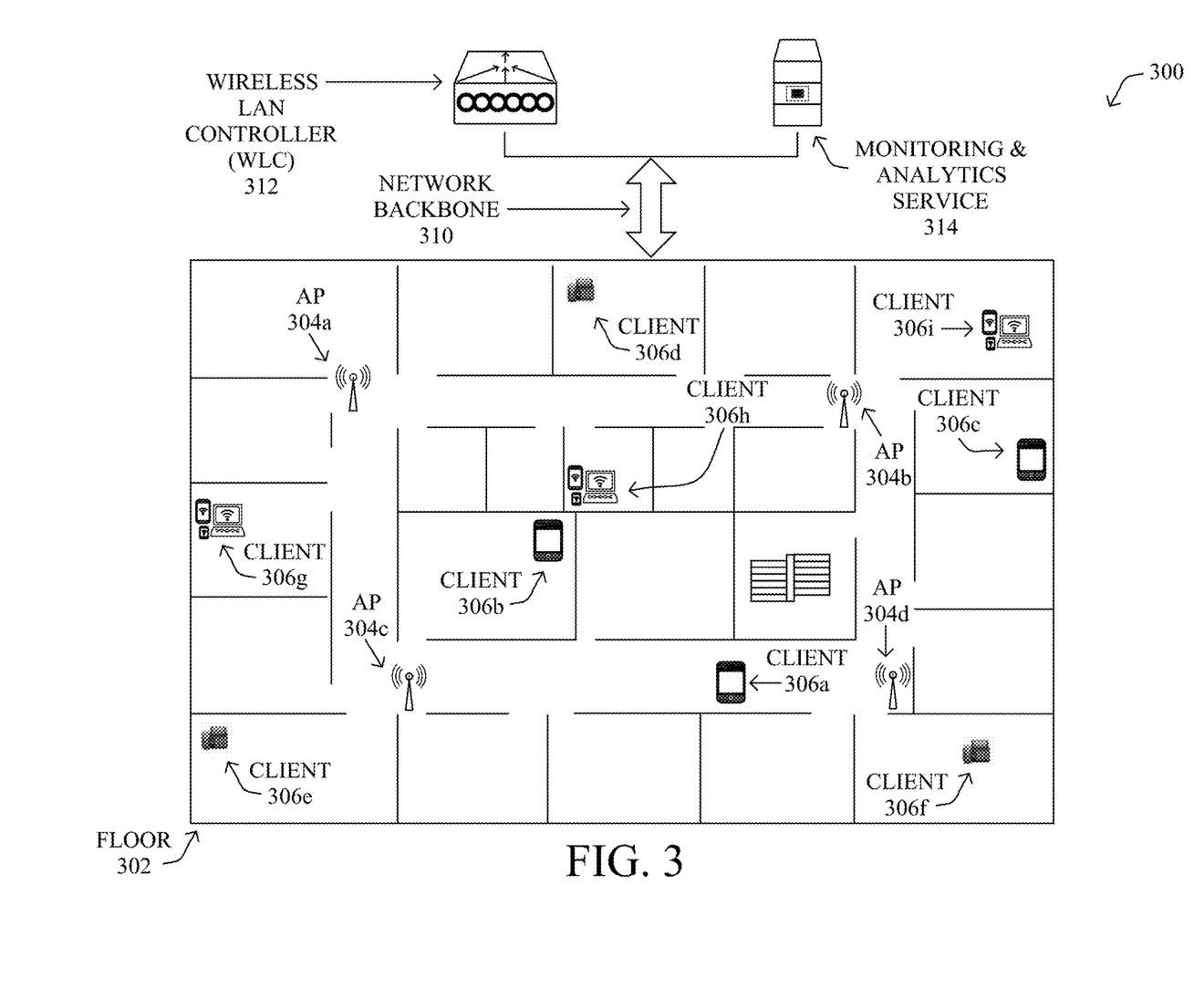
FIG. 3 illustrates an example wireless network.

FIG. 3 illustrates an example wireless network 300, according to various embodiments. Wireless network 300 may be deployed to a physical location, such as floor 302 shown, and may include various infrastructure devices. These infrastructure devices may include, for example, one or more access points (APs) 304 that provide wireless connectivity to the various wireless clients 306 distributed throughout the location. For illustrative purposes, APs 304a-304d and clients 306a-306i are depicted in FIG. 3. However, as would be appreciated, a wireless network deployment may include any number of APs and clients.

A network backbone 310 may interconnect APs 304 and provide a connection between APs 304 and any number of supervisory devices or services that provide control over APs 304. For example, as shown, a wireless LAN controller (WLC) 312 may control some or all of APs 304a-404d, by setting their control parameters (e.g., max number of attached clients, channels used, wireless modes, etc.). Another supervisory service that oversees wireless network 300 may be a monitoring and analytics service 314 that measures and monitors the performance of wireless network 300 and, if so configured, may also adjust the operation of wireless network 300 based on the monitored performance (e.g., via WLC 312, etc.). Note that service 314 may be implemented directly on WLC 312 or may operate in conjunction therewith, in various implementations.

Network backbone 310 may further provide connectivity between the infrastructure of the local network and a larger network, such as the Internet, a Multiprotocol Label Switching (MPLS) network, or the like. Accordingly, WLC 312 and/or monitoring and analytics service 314 may be located on the same local network as APs 304 or, alternatively, may be located remotely, such as in a remote datacenter, in the cloud, etc. To provide such connectivity, network backbone 310 may include any number of wired connections (e.g., Ethernet, optical, etc.) and/or wireless connections (e.g., cellular, etc.), as well as any number of networking devices (e.g., routers, switches, etc.).

The types and configurations of clients 306 in network 300 can vary greatly, ranging from powerful computing devices to any number of different types of IoT nodes/devices. For example, clients 306a-306i may include, but are not limited to, wireless sensors, actuators, thermostats, relays, and the like.

As noted above, most IoT devices do not need high bandwidth operation. For example, a sensor may periodically take a measurement, transmit the reading, and go to sleep, to conserve battery power. This type of operation is in direct conflict with the trend of wireless networks to provide more and more bandwidth to wireless clients. Indeed, when a wireless AP has both low bandwidth IoT clients and high bandwidth clients in the same radio, the overall performance would be significantly degraded. High density wireless environments tend to remove low data rates, to increase the RF utilization. However, as a result, the AP cannot properly serve IoT devices which require low data rate.

Serving IoT Devices in a Wireless Network

The techniques herein leverage dynamic radio role assignments in an access point, to better serve IoT and other wireless clients that require little bandwidth. In some aspects, a radio of the access point can be designated as a channel monitor and can also be used to service low-bandwidth clients that only need to occasionally communicate with the access point. In further aspects, the access point can also use 802.11 target wake times (TWT), to schedule wake times for the clients so that the monitor radio is on the same channel as an awake client assigned to the radio.

Specifically, according to one or more embodiments of the disclosure as described in detail below, a device assigns a first radio of an access point in a wireless network to a client serving role and a second radio of the access point to a channel monitoring role. The device associates a wireless client with the first radio. The device determines that the wireless client is a low bandwidth client. The device switches the wireless client from the first radio to the second radio of the access point assigned to the channel monitoring role.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein.

Figure 4A:
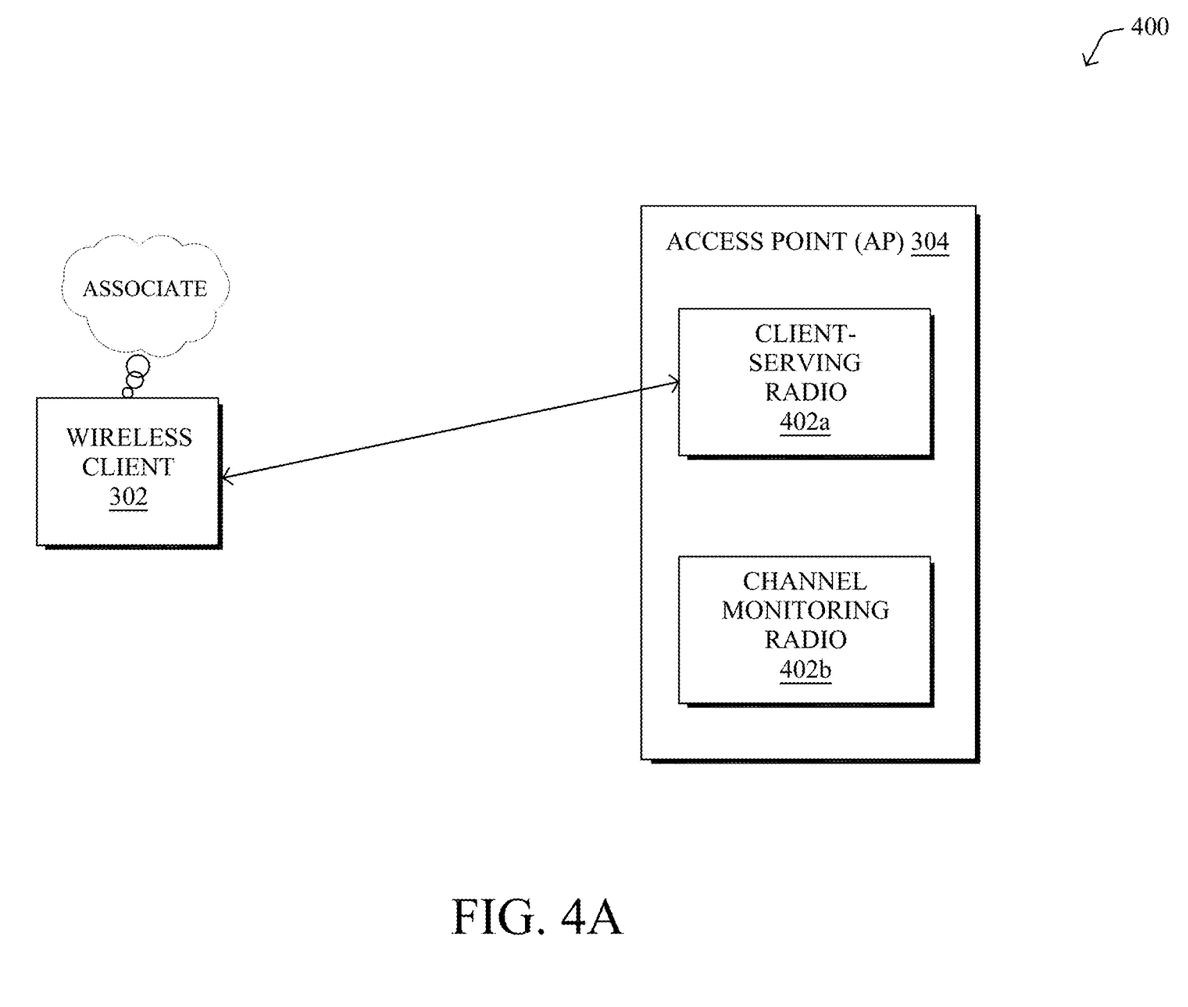
FIGS. 4A-4C illustrate an example of using a channel monitoring radio to serve a wireless client.
Figure 4B:
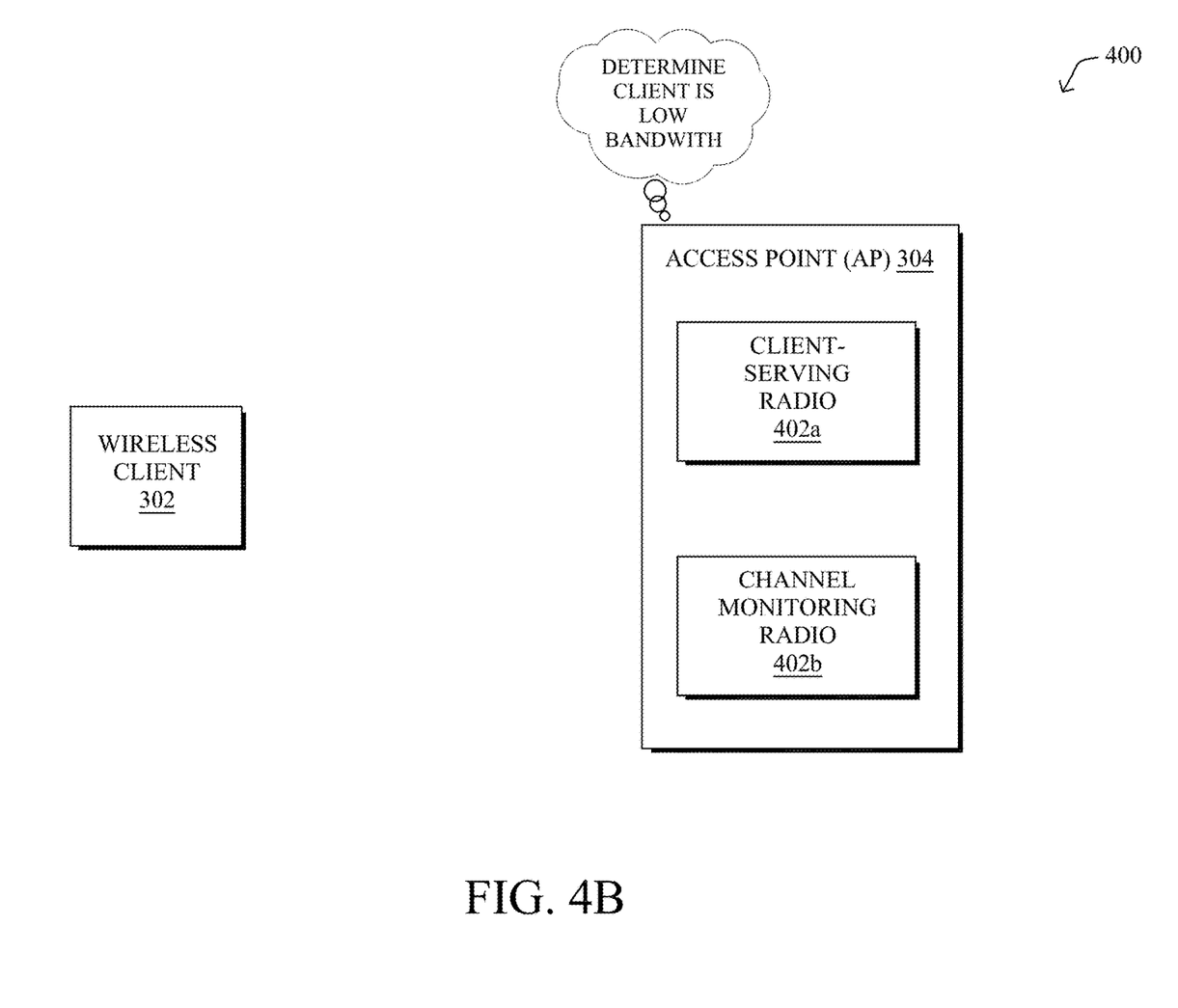
Figure 4C:
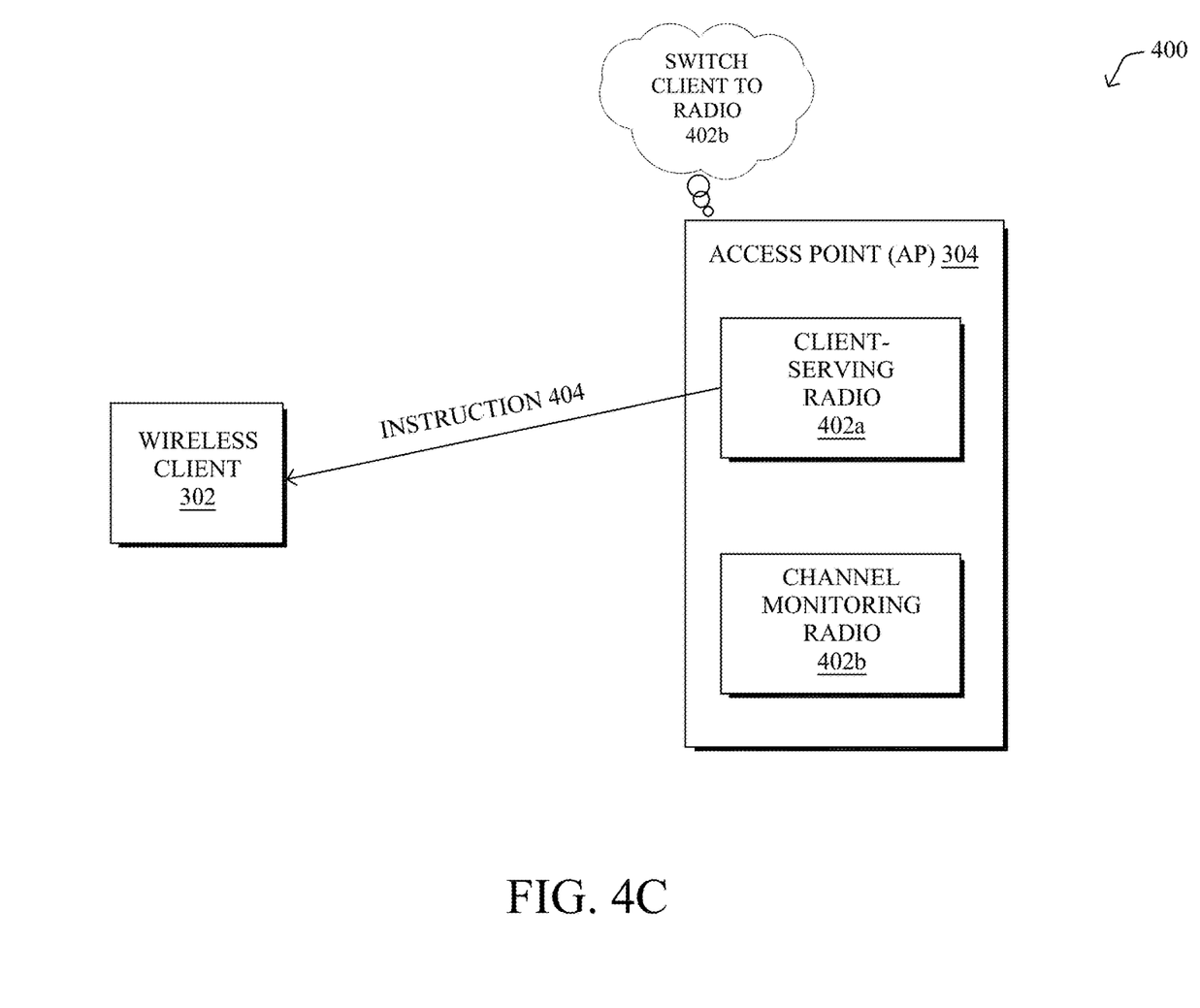

Operationally, FIGS. 4A-4C illustrate an example of using a channel monitoring radio to serve a wireless client, according to various embodiments. In some embodiments, a wireless access point may be configured to dynamically assign different roles to radios of the access point. For example, Flexible Radio Architecture (FRA) by Cisco Systems, Inc. dynamically assigns radios of an access point to one of three different roles:

2.4 GHz Operation—this mode can be used to support legacy clients that only operate on the 2.4 GHz spectrum, clients that require 2.4 GHz communications due to their range to the access point, or the like.

5 GHz Operation—this mode can be used to service newer devices that support 5 GHz communications, devices that require higher bandwidth than 2.4 GHz supports, etc.

Channel Monitoring—this mode can be used by the access point to continually scan the 2.4 GHz and 5 GHz bands for interference, location assessment, radio resource management, clean air, security threats, etc.

Typically, an access point that supports dynamic radio roles will include two or more radios that may be dual-band radios. For example, as shown, assume that an access point (AP) 304 includes two radios: radio 402a and radio 402b, each of which may operate in the 2.4 GHz spectrum and/or the 5 GHz spectrum, depending on its configuration and assigned role. These roles, and the channels used by radios 402a-402b, can be selected dynamically, either by AP 302 or a supervisory device, such as a WLC.

For purposes of illustration, assume that AP 302 has assigned a client-serving role to radio 402a and a channel monitoring role to radio 402b. In such a case, radio 402a may serve wireless clients of AP 304. For example, a wireless client 302 may associate with client-serving radio 402a via the 5 GHz spectrum. Meanwhile, channel monitoring radio 402b of AP 304 may continually scan the various channels that AP 304 could use, as detailed above.

As would be appreciated, one challenge in serving a large number of low-bandwidth clients, such as many IoT devices, is the relatively disproportionate resource consumption by these devices on the wireless network. For example, assume that wireless client 302 is a low-bandwidth IoT device that only periodically communicates data to AP 304. Under normal circumstances, AP 304 will not make a distinction between client 302 and other, more capable clients, meaning that client 302 will needlessly consume more bandwidth from AP 304 than it needs.

According to various embodiments, an AP and/or its supervisory device (e.g., WLC, monitoring service, etc.) may identify a client as low-bandwidth and, in turn, switch that client to the radio of the AP in the channel monitoring role. Said differently, the techniques herein propose devoting at least a portion of the time of the channel monitoring radio of the AP to serving low-bandwidth clients. For example, as shown in FIG. 4B, AP 304 may determine that client 302 is a low bandwidth device. To do so, any or all of the following information can be used to determine that client 302 is a low-bandwidth device:

- A device type associated with client 302—In some cases, the device type of client 302 can either be identified explicitly or inferred from the behavior of client 302. For example, client 302 may leverage a Manufacturer Usage Description (MUD), to explicitly signal its device type to the wireless network. In another example, a device classification service in the network could identify the type of client 302 based on its observed traffic (e.g., via packet inspection, the destination of its traffic, etc.).
- Observed bandwidth usage by client 302—Even if the specific type of client 302 is not known to the network, if the observed bandwidth usage by client 302 is below a predefined threshold, it may be flagged as a low-bandwidth client. For example, if client 302 typically only sends less than 1 kb per communication, this could indicate that client 302 is low-bandwidth.
- Sleep patterns of client 302—Another factor that could indicate whether client 302 is a low-bandwidth device is the length of its sleep operations, if it only communicates infrequently with the network. For example, if the duration of a sleep cycle of client 302 exceeds one hour, this could also indicate that client 302 is a low-bandwidth device.

As shown in FIG. 4C, once AP 302 has determined that client 302 is a low-bandwidth client, it may send an instruction 404 to wireless client 302 that causes client 302 to instead use channel monitoring radio 402b of AP 304. For example, instruction 404 may take the form of a channel switch announcement (CSA) that causes client 302 to switch to a channel that is also being used by channel monitoring radio 402b. In a further embodiment, AP 304 may employ to switch client 302 to channel monitoring radio 402b could be to have AP 304 send a spoofed basic service set identifier (BSSID) to wireless client 302 that causes it to use radio 402b of AP 304, instead.

Preliminary testing of the techniques herein has shown that servicing a single low-bandwidth client using the monitoring radio of an AP consumes less than 0.1% of the radio resources of the AP, offering a significant improvement over serving the client using the radio of the AP in the client serving role.

Figure 5:
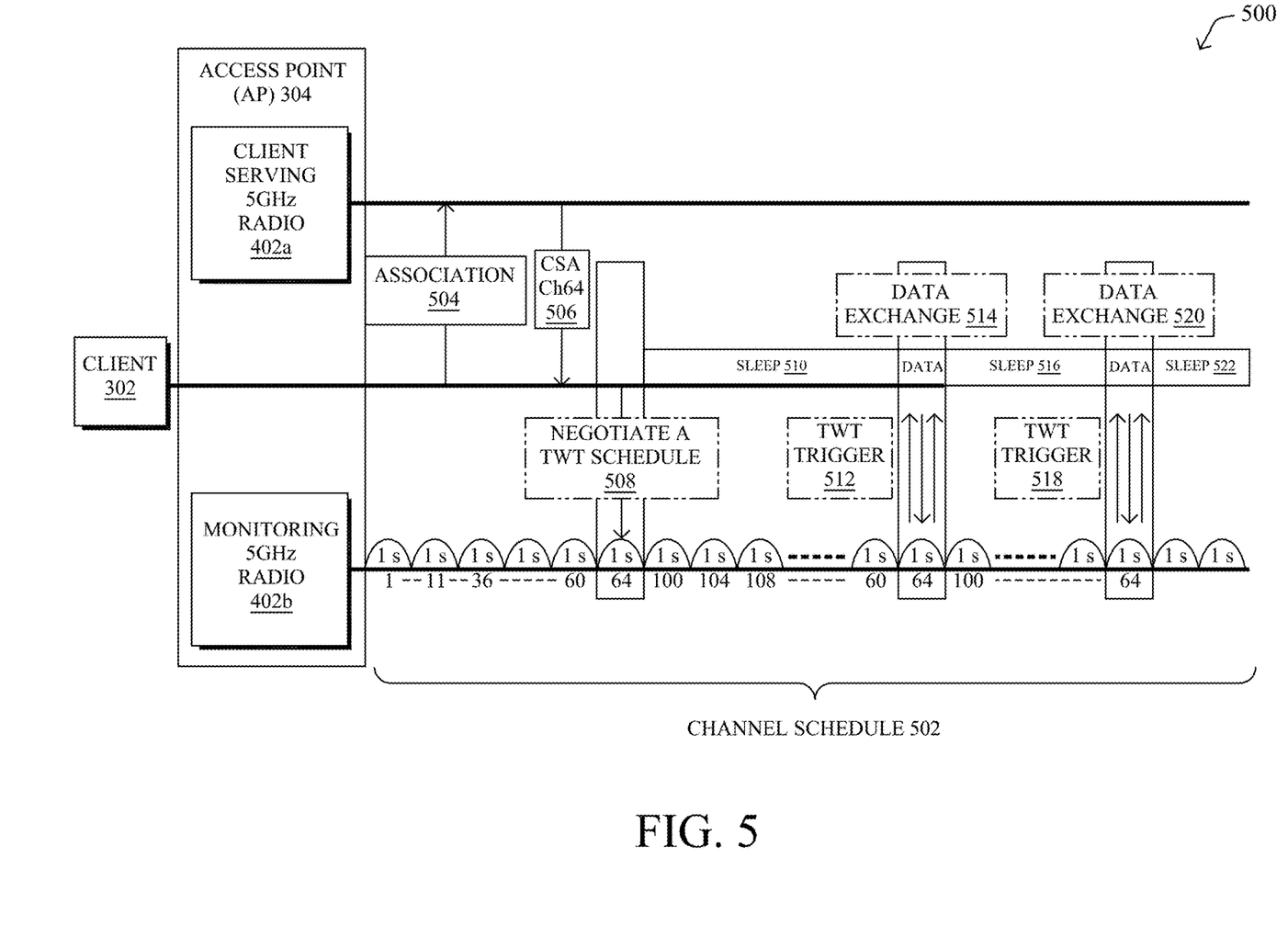
FIG. 5 illustrates an example of the channel operations of an access point.

FIG. 5 illustrates an example 500 of the channel operations of access point 302, in accordance with the teachings herein. Continuing the examples in FIGS. 4A-4C, assume that client 302 first performs an association 504 with AP 304 via radio 402a of AP 304 that has been assigned to the role of serving clients on the 5 GHz spectrum. Meanwhile, radio 402b of AP 304 may be assigned to a channel monitoring role, following channel schedule 502 to identify potential interference, security threats, etc.

At some point in time, AP 304 may determine that client 302 is a low-bandwidth client and that client 302 should be switched over to using radio 402b. To do so, radio 402a may issue a CSA 506 to client 302 that indicates that client 302 should next communicate with AP 304 on wireless channel 64, which will be used by radio 402b. Thus, when client 302 next communicates with AP 304, it may do so via monitoring radio 402b, instead of client serving radio 402a.

According to various embodiments, AP 304 and client 302 may also leverage target wake times (TWTs), which are defined in the 802.11ax standard, to schedule when client 302 should wake from its sleep mode. In general, TWT in 802.11ax is a power saving mechanism which negotiates between a client and its AP, allows the client to sleep for periods of time, and wake up in pre-scheduled (target) times to exchange data.

For example, as shown, client 302 and AP 304 may negotiate a TWT schedule 508 that indicates that client 302 should sleep for time period 510 before attempting to again communicate with AP 302 on channel 64. Once the TWT trigger 512 completes (e.g., client 302 determines that the specified amount of time has elapsed), client 302 may 'wake' from its sleep mode by powering its radio and performing a data exchange 514 with AP 304 via radio 402b. AP 302 and client 304 may repeat this process any number of times, such as by client 302 proceeding to enter sleep again for time period 516 after completing data exchange 514. Once TWT trigger 518 occurs, client 304 may again wake and perform another data exchange 520 with AP 304 on channel 64, before again returning to sleep for time period 522.

As would be appreciated, the time slots assigned to client 302 in channel schedule 502 of monitoring radio 402b only consume a relatively small percentage of its full schedule. This means that radio 402b can continue to perform its channel monitoring functions when not serving client 302 and other low-bandwidth device that use radio 402b. For example, once radio 402b has competed a data exchange with client 302, it may scan other channels (e.g., channel 100, then 104, then 108, etc.), before returning to channel 64 to again communicate with client 302.

Figure 6:
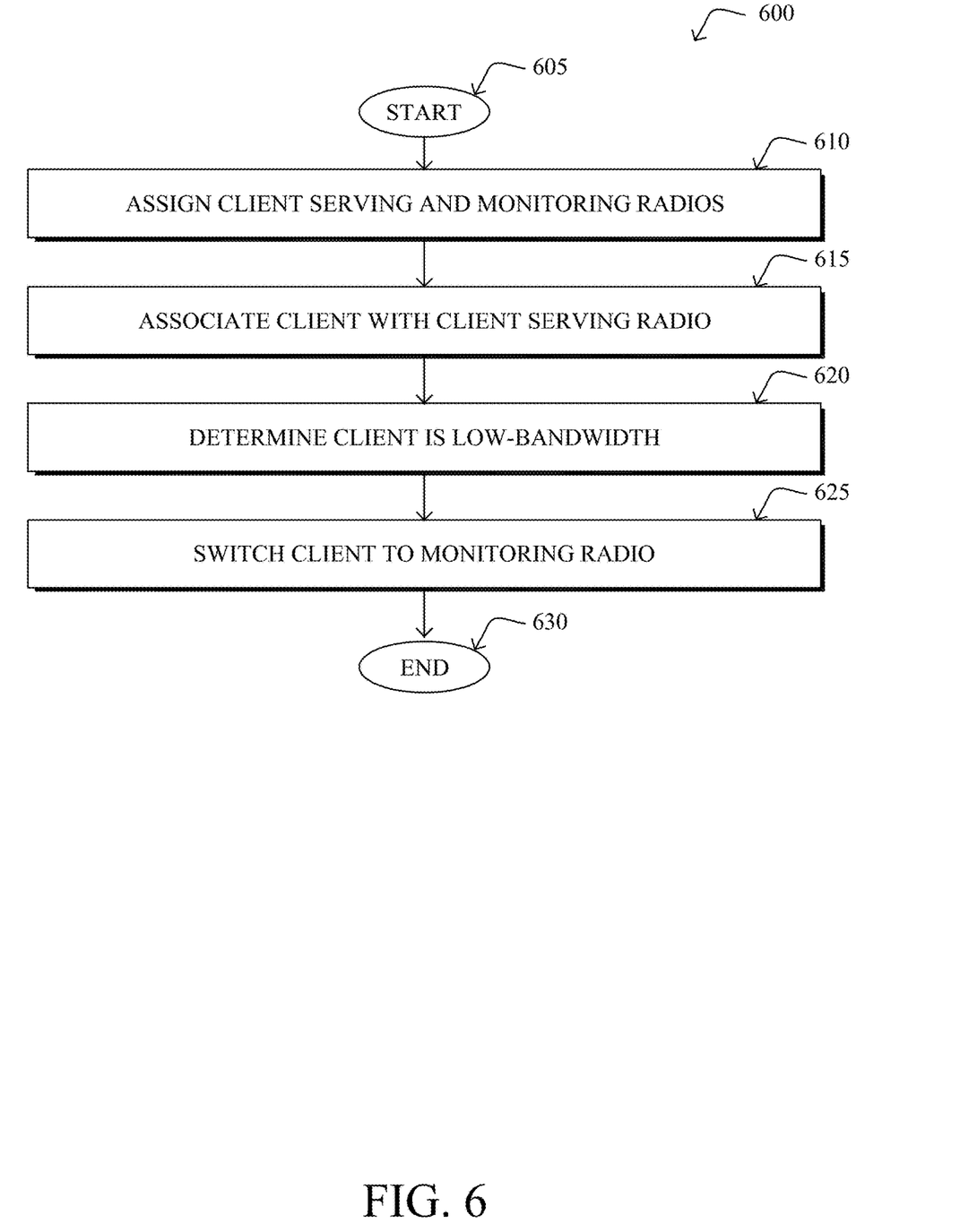
FIG. 6 illustrates an example simplified procedure for switching a client to a monitoring radio of an access point.

FIG. 6 illustrates an example simplified procedure for using spatial modulation for power savings, in accordance with one or more embodiments described herein. For example, a non-generic, specifically configured device (e.g., device 200) may perform procedure 600 by executing stored instructions (e.g., process 248), such as an access point in a wireless network or another device in communication therewith. The procedure 600 may start at step 605, and continues to step 610, where, as described in greater detail above, the device may assign a first radio of an access point in a wireless network to a client serving role and a second radio of the access point to a channel monitoring role.

At step 615, as detailed above, the device may associate a wireless client with the first radio, which is in the client serving role. In various embodiments, the wireless client may be an IoT or other device that requires only a relatively low amount of bandwidth of the access point.

At step 620, the device may determine that the wireless client is a low bandwidth client, as described in greater detail above. In some embodiments, the device may do so based an identification of the device type of the client. For example, if the client is known to be a particular type of IoT sensor, the device may determine that the client has low bandwidth requirements. In further embodiments, the device may make the determination based on the monitored bandwidth usage or sleep schedule of the client. For example, if the client sleeps for a period of time that exceeds a defined threshold or only transmits an amount of data lower than another threshold, the device may flag the client as low bandwidth.

At step 625, as detailed above, the device may switch wireless client from the first radio to the second radio of the access point assigned to the channel monitoring role. For example, the access point may send a CSA message to the client that specifies a channel that will be used by the second radio to communicate with the client. In further embodiments, the device may also negotiate a TWT schedule with the wireless client such that the wireless client wakes during the time slots reserved for servicing the wireless client. As would be appreciated, the second radio, when not servicing the client or any other low bandwidth clients of the AP, may continue to perform its assigned channel monitoring role. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for low bandwidth clients to be offloaded to a channel monitoring radio of an access point. In doing so, bandwidth is conserved for more demanding clients of the access point.

While there have been shown and described illustrative embodiments that provide for serving a client with the channel monitoring radio of an access point, it is to be understood that various other adaptations and modifications may be made within the spirit and scope of the embodiments herein. For example, while certain protocols are shown, such as 802.11, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    assigning, by an access point in a wireless network, a first radio of the access point to a client serving role and a second radio of the access point to a channel monitoring role;
    associating, by the access point, a wireless client with the first radio;
    determining, by the access point, that the wireless client is a low bandwidth client;
    switching, by the access point, the wireless client from the first radio to the second radio of the access point assigned to the channel monitoring role; and
    generating, by the access point, a channel monitoring schedule for the second radio that includes time slots reserved for exchanging data between the second radio and the wireless client,
    wherein the wireless client wakes from a sleep mode before exchanging data via the reserved time slots with the second radio and re-enters the sleep mode after exchanging data with the second radio.

2. The method as in claim 1, wherein switching the wireless client from the first radio to the second radio of the access point assigned to the channel monitoring role comprises:
    sending a channel switch announcement (CSA) to the wireless client, to cause the wireless client to switch to the second radio of the access point.

3. The method as in claim 1, wherein determining that the wireless client is a low bandwidth client comprises:
    identifying a device type associated with the wireless client.

4. The method as in claim 1, wherein determining that the wireless client is a low bandwidth client comprises:
    monitoring a bandwidth usage or sleep schedule of the wireless client.

5. The method as in claim 1, further comprising:
    negotiating a target wake time (TWT) schedule with the wireless client such that the wireless client wakes during the time slots, and wherein the second radio of the access point and the wireless client are on a same channel during one of the time slots.

6. The method as in claim 1, wherein the first and second radios operate on the 5 GHz wireless spectrum.

7. The method as in claim 1, wherein switching the wireless client from the first radio to the second radio of the access point assigned to the channel monitoring role comprises:
    sending a spoofed basic service set identifier (BSSID) to the wireless client.

8. An apparatus, comprising:
    one or more network interfaces to communicate with a wireless network;
    a processor coupled to the network interfaces and adapted to execute one or more processes; and
    a memory configured to store a process executable by the processor, wherein the apparatus is an access point in the wireless network, and wherein the processor, upon executing the stored process, is configured to:
    assign a first radio of the access point to a client serving role and a second radio of the access point to a channel monitoring role;
    associate a wireless client with the first radio;

determine that the wireless client is a low bandwidth client;

switch the wireless client from the first radio to the second radio of the access point assigned to the channel monitoring role; and generate a channel monitoring schedule for the second radio that includes time slots reserved for exchanging data between the second radio and the wireless client, wherein the wireless client wakes from a sleep mode before exchanging data via the reserved time slots with the second radio and re-enters the sleep mode after exchanging data with the second radio.

9. The apparatus as in claim 8, wherein the apparatus switches the wireless client from the first radio to the second radio assigned to the channel monitoring role by:

sending a channel switch announcement (CSA) to the wireless client, to cause the wireless client to switch to the second radio of the access point.

10. The apparatus as in claim 8, wherein the apparatus determines that the wireless client is a low bandwidth client by:

identifying a device type associated with the wireless client.

11. The apparatus as in claim 8, wherein the apparatus determines that the wireless client is a low bandwidth client by:

monitoring a bandwidth usage or sleep schedule of the wireless client.

12. The apparatus as in claim 8, wherein the process when executed is further configured to:

negotiate a target wake time (TWT) schedule with the wireless client such that the wireless client wakes during the time slots reserved for servicing the wireless client, and wherein the second radio of the access point and the wireless client are on a same channel during one of the time slots.

13. The apparatus as in claim 8, wherein the first and second radios operate on the 5 GHz wireless spectrum.

14. The apparatus as in claim 8, wherein the apparatus switches the wireless client from the first radio to the second radio assigned to the channel monitoring role by:

sending a spoofed basic service set identifier (BSSID) to the wireless client.

15. A tangible, non-transitory, computer-readable medium storing program instructions that cause an access point in a wireless network to execute a process comprising:

assigning a first radio of the access point to a client serving role and a second radio of the access point to a channel monitoring role;

associating a wireless client with the first radio;

determining that the wireless client is a low bandwidth client;

switching the wireless client from the first radio to the second radio of the access point assigned to the channel monitoring role; and generating a channel monitoring schedule for the second radio that includes time slots reserved for exchanging data between the second radio and the wireless client, wherein the wireless client wakes from a sleep mode before exchanging data via the reserved time slots with the second radio and re-enters the sleep mode after exchanging data with the second radio.

16. The computer-readable medium as in claim 15, wherein the process further comprises:

negotiating a target wake time (TWT) schedule with the wireless client such that the wireless client wakes during the time slots reserved for servicing the wireless client, and wherein the second radio of the access point and the wireless client are on a same channel during one of the time slots.

17. The computer-readable medium as in claim 15, wherein the wireless client is a battery-powered Internet of Things (IoT) device.

\* \* \* \* \*